United States Patent [19]

Landgraf

[11] 4,322,665
[45] Mar. 30, 1982

[54] TWO SPEED SINGLE PHASE MOTOR

[75] Inventor: Robert A. Landgraf, St. Louis, Mo.

[73] Assignee: Emerson Electric Co., St. Louis, Mo.

[21] Appl. No.: 56,024

[22] Filed: Jul. 9, 1979

[51] Int. Cl.³ .......................................... H02K 17/08
[52] U.S. Cl. .................................... 318/774; 318/775; 310/166;198;185; 310/198
[58] Field of Search ............... 318/767, 816, 774, 775; 310/166, 198, 185

[56] References Cited

U.S. PATENT DOCUMENTS

| | | | |
|---|---|---|---|
| 2,671,879 | 3/1954 | Schwarz | 318/774 |
| 2,774,024 | 12/1956 | Brammerlo | 318/774 |
| 2,774,924 | 12/1956 | Witt | 318/774 |
| 3,359,476 | 12/1967 | Charlton | 318/774 |
| 3,368,131 | 2/1968 | Ross | 318/774 |
| 3,887,854 | 6/1975 | Parks | 318/775 |
| 4,066,937 | 1/1978 | Pfarrer et al. | 318/778 |
| 4,103,213 | 7/1978 | Landgraf | 318/775 |

Primary Examiner—Donovan F. Duggan
Attorney, Agent, or Firm—Polster, Polster and Lucchesi

[57] ABSTRACT

A two speed, single phase electric motor having a stator assembly including a main winding and a supplemental winding. Each of these windings includes a pair of coil sets. The main winding coil sets and the supplemental winding coil sets are so connected to a source of electrical power such that during high speed operation of the motor the number of effective turns is the sum of the turns in one main winding coil set and its supplemental winding coil set, and during low speed operation, only the turns in the main winding coil set are energized so that there are fewer effective turns. Thus, by varying the number of turns included in the supplemental winding coil sets while keeping the total number of effective turns in the main winding and supplemental winding constant, the low speed breakdown torque of the motor may be preselected during the design of the motor to be less than, equal to, or greater than a desired high speed breakdown torque.

2 Claims, 6 Drawing Figures

HIGH SPEED

LOW SPEED

TWO SPEED SINGLE PHASE MOTOR

BACKGROUND OF THE INVENTION

This invention relates to dynamoelectric machines, and in particular, to single phase multi-speed induction motors. While the invention is described with particular reference to motors used in hermetic compressor applications, those skilled in the art will recognize the wider applicability of the inventive principles disclosed hereinafter.

There has long been a need in the residential refrigeration market for efficient and economical equipment. The rising cost of energy, in all forms, has tended to accent this need. One area where improved efficiency can be obtained is in the sizing of the equipment itself so that efficient operation is attained over a wide range of load conditions. In the past, it has been difficult to size the equipment so that the equipment, as installed, has ample capacity for peak load conditions, and also operates efficiently and provides comfort at lighter load conditions. Prior art solutions to the sizing problems usually involve various mechancial unloading devices in order to regulate the system. The terms refrigeration and air conditioning are herein used interchangeably in their broadest generic sense, and are intended to include any system having an electric induction motor as an element.

Recently, attempts have been made to modulate the compressor of the refrigeration system by operating the compressor at two distinct speeds. One example of a two speed motor useful in this modulation is shown and described in U.S. Pat. No. 4,103,212, granted July 25, 1978 and assigned to the assignee of the present invention. Briefly, this two speed motor described in the above-noted U.S. patent is a so-called consequent pole motor and its low speed torque is fixed at about half (i.e., about 55 percent) of its high speed torque.

In general, multiple speed motors are well-known in the art. In the past, multiple speed motors conventionally have been of two types, viz, distinct winding motors and consequent pole motors. So-called distinct winding single phase motors are constructed by placing a plurality of distinct windings within a stator core, and thereafter switching between the sets of distinct windings to vary the motor speed. For the purposes of this specification, the term "distinct winding" means that each main winding of the motor has a corresponding auxiliary winding used only in conjunction with its main winding. With this type of motor construction, the number of main winding poles conventionally equals the number of auxiliary winding poles and there is a winding set consisting of one main and one auxiliary winding for each operating speed of the motor.

While these distinct winding, multiple speed motors work well for their intended purposes, and while the torque of the motor in its low speed mode of operation can be selected to be any desired amount of its high speed torque by varying the turns in the distinct windings, distinct winding motors generally have been used in applications where the slot fill of the motor is not critical. "Slot fill" is a term of art, and generally refers to the slot area displaced by the turns of the motor windings divided by the total usable slot area, expressed as a percentage. In many induction motor applications, slot fills are not critical, and ample slot space is provided in the lamination design for carrying a number of motor windings in the slots of the stator assembly. However, since separate main and auxiliary windings must be provided for each motor speed, distinct winding motors have presented problems in motor applications where slot fill is critical. Also, distinct winding motors require a considerable amount of magnet wire for the distinct windings which adds to the cost of the motor.

Hermetic motors, on the other hand, usually require slot fill concentrations so as to result in the highest possible output for the smallest motor volume. This generally precludes the use of multiple independent or distinct windings. In general, high slot fills are desirable to achieve efficient motor operation, and motor performance can be improved by increasing the amount of material used in the windings of the stator. This expedient is practiced extensively in hermetic motor design. However, this adds to the manufacturing cost of the motor.

An additional factor involved in motor design for hermetic motors is the fact that the hermetic motor is enclosed and hermetically sealed within the compressor unit of the refrigeration system. Electrical connections are made through the shell of the compressor. The shell has a connection opening therethrough, and a special connector that preserves the integrity of the refrigerant system is inserted in and hermetically seals the opening. The use and insertion of the connectors in the shell add significantly to the cost of the compressor. Consequently, a general design requirement is that motors utilized in hermetic compressors should incorporate a minimum number of leads so as to minimize construction problems and the cost inherent in making multiple electrical connector openings through the compressor shell.

In multiple speed motors, the motor usually has its highest torque (and hence highest horsepower output) when operated at its high speed mode of operation. For example, in a two pole/four pole motor, the motor may be operated at approximately 3,600 rpm (ignoring slip) when in its high speed mode and approximately 1,800 rpm when in its low speed mode. However, as heretofore mentioned, the torque output of a conventional consequent pole motor, when operated in its low speed mode is only about half (e.g., 55 percent) of its torque output when operated in its high speed mode. Since the power output of a motor is directly proportional to the product of the motor speed and the torque of the motor, the power output of such consequent pole motors when operated at low speed is only about $\frac{1}{4}$ of its power when operated at high speed. In many motor applications and under many load conditions, such consequent pole multiple speed motors do not develop sufficient torque (or horsepower) when operated at low speed.

As mentioned above, while the torque of distinct winding motors may be of any desired output when the motor is operated in low speed, these distinct winding motors have high slot fills and require such additional material that they cannot be effectively utilized in many hermetic motor applications. Hence, there has been a need for a two speed motor which develops more torque than a conventional consequent pole two speed motor when operated in its low speed mode of operation, and yet which is less expensive to manufacture, which is more compact, and which has lower slot fills than prior art distinct winding multiple speed motors.

For additional background information, reference may be made to my co-assigned U.S. Pat. No. 4,103,213 issued July 25, 1978, which discloses a two-speed, single phase consequent pole induction motor.

Among the several objects and features of the present invention may be noted the provision of a multiple speed, single phase induction motor or other dynamo-electric machine which can be readily designed to give any desired breakdown torque (i.e., maximum torque) during its low speed operational mode which is less than, equal to, or greater than a desired breakdown torque of the motor when operated in its' high speed mode;

The provision of such a motor which efficiently uses the material incorporated in the motor and is therefore less expensive to manufacture;

The provision of such a motor in which the slot fills of the stator core are not excessive;

The provision of such a motor which does not require separate or distinct main and auxiliary windings for each operational speed of the motor;

The provision of such a motor which has a minimum number of leads required for energization of the motor;

The provision of a method of constructing a two speed electric motor which, during design of the motor, enables the breakdown torque of the motor, when operated in its low speed mode, to be of virtually any desired value less than, equal to, or greater than a desired high speed breakdown torque of the motor;

The provision of such a method which enables the production of such two speed motors with conventional production equipment;

The provision of such a method which may be used to manufacture any multi-speed motor having twice as many electrical poles when operated at low speed as when operated at high speed;

The provision of such a motor which enables the breakdown torque of the motor to be matched to the load on the motor when the motor is operated in both, its low and high speed modes; and The provision of such a motor which is economical to manufacture, which is efficient in operation, and which has a long service life.

Other objects and features of this invention will be in part apparent and in part pointed out hereinafter.

SUMMARY OF THE INVENTION

Briefly, a multiple speed, dynamoelectric machine (e.g., a two speed electric motor or the like) comprises a rotor assembly and a stator assembly. The latter includes a stator core constructed from a stack of laminations of suitable ferro-magnetic material, each of the laminations having a central opening therethrough with a plurality of notches extending generally radially outwardly from the central opening. The latter constitutes a bore extending longitudinally through the core for reception of the rotor assembly and the notches constitute a plurality of slots extending longitudinally through the core for receiving a plurality of windings. A main winding including two physical poles or coil sets is provided. Each of the main winding coil sets has one or more coils which are inserted into respective slots of the core with the main winding coil sets being on generally opposite sides of the bore. A supplemental or extended winding is also provided which again includes two physical poles or coil sets, each of which has at least one coil therein. The stator assembly further includes a first auxiliary winding and a second auxiliary winding. A plurality of leads are electrically connected to the main, supplemental, and auxiliary windings for multiple speed operation of the motor. The leads are so connected to the coil sets of the main and supplemental windings such that during one speed of operation of the motor, the supplemental winding is deenergized.

The method of this invention of constructing a multi-speed electric motor will now be herein briefly described. The motor to be constructed typically includes a rotor assembly and a stator assembly with the latter having a core with a bore therethrough for reception of the rotor assembly. The core further has a plurality of winding receiving slots therein. The method of this invention comprises forming a main winding having two coil sets, each of these coil sets having an outer coil and at least one inner coil. A supplemental winding having two coil sets is also formed. The coils of one main winding coil set and a corresponding supplemental winding coil set are inserted in the slots of the core so that the coil sets of the main and supplemental windings are generally on opposite sides of the bore. A plurality of leads is then connected to the coils of the main and supplemental windings such that when the motor is operated in a low speed mode of operation, the supplemental winding is deenergized.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
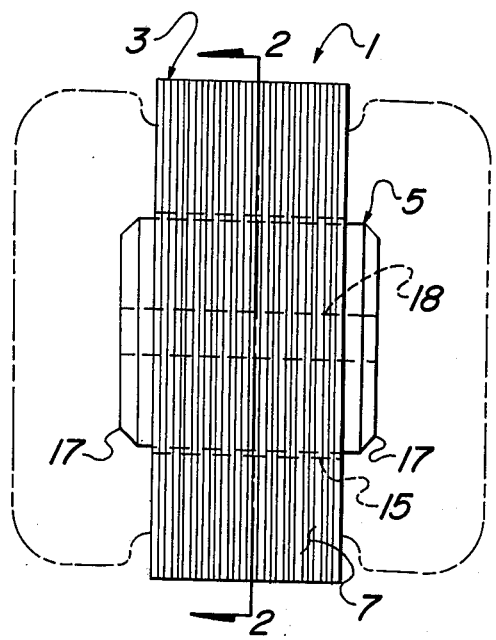
FIG. 1 is a side elevational view of a multi-speed induction motor of this invention with the stator assembly and the rotor assembly of the motor shown in solid lines and with the windings of the motor shown in phantom.

Referring now to the drawings, a multiple speed dynamoelectric machine or motor of this invention is indicated in its entirety by reference character 1 in FIG. 1. The motor herein shown is a hermetic motor, but it will be understood that the improvement of this invention may readily be incorporated in any multi-speed induction motor having a stator assembly with twice as many poles when operated at low speed as it has when it is operated at high speed.

Motor 1 is shown to include a stator assembly generally indicated at 3 and a rotor assembly 5. The former includes a core 7 consisting of a stack of laminations 9 (see FIG. 2) punched from sheet-like ferro-magnetic material with each lamination having a central opening 11 and a plurality of notches 13 extending radially outwardly from the central opening and being generally equally angularly spaced therearound. When laminations 9 are stacked to form core 7, central openings 11 of the laminations are coaxial and constitute a bore 15 extending longitudinally through the core and notches 13 form a plurality of slots or receptacles generally indicated at S extending longitudinally through the core (see FIG. 2).

Rotor assembly 5 is preferably a squirrel cage design having a stack of rotor laminations (not shown) with a plurality of rotor slots extending longitudinally therethrough. These rotor slots receive the rotor bars of the squirrel cage rotor and the ends of the bars are terminated along outer faces of the rotor body by conductive end rings 17 in a conventional manner. The above-described structure of the rotor constitutes a rotor body having a rotor shaft 18 which extends therethrough for reception of a hermetic compressor crankshaft (not shown) which rotatably supports the rotor body within bore 15 of stator 3. Rotor assembly 5 is herein described as conventional and does not per se constitute a part of the present invention.

Figure 2:
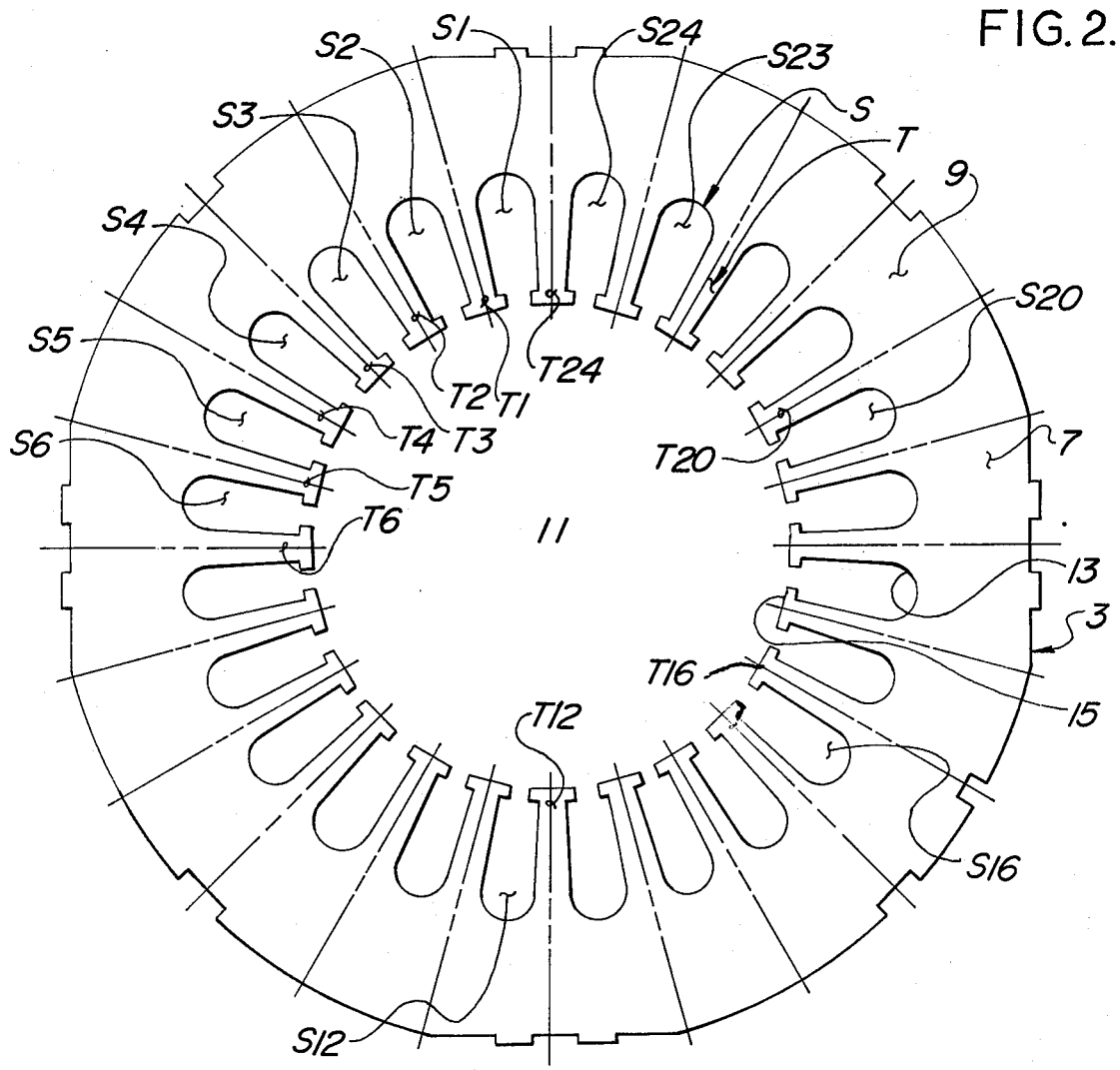
FIG. 2 is an enlarged cross-sectional view taken along line 2—2 of FIG. 1 with the windings and the rotor assembly omitted for clarity.

Again referring to FIG. 2, it can be seen that each lamination 9 (and hence core 7) has a plurality of radial teeth, as generally indicated at T, spaced at equal angular intervals around bore 11 thus defining, at least in part, slots S. As shown in FIG. 2, core 7 has twenty-four slots therein and these slots are designated S1–S24. Teeth T are diagrammatically represented in FIG. 3 as lines separating slots S1–S24 and each tooth is separately referred to by a respective reference character T1–T24. It will be understood that while the stator assembly is shown to include twenty-four slots, other stator assemblies having different number of slots may be utilized in accordance with this invention.

Figure 3:
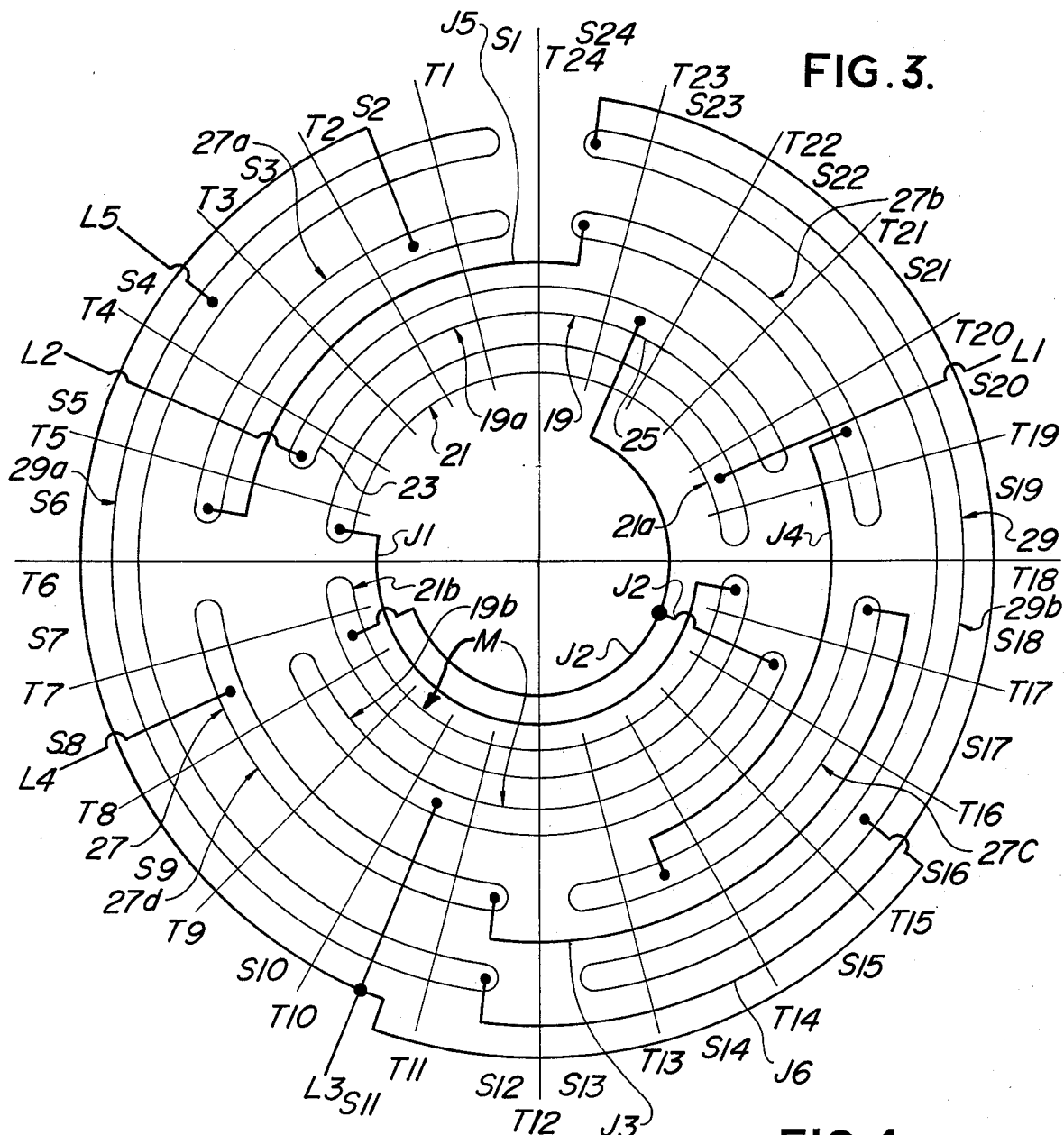
FIG. 3 is a winding connection diagram of a single phase, two pole/four pole motor of this invention illustrating the placement of coils of wire constituting the windings of the motor of this invention as they are received in their respective slots in the core of the stator assembly and showing leads connected to the various coils of the winding and showing various jumpers interconnecting the windings.

Referring now to FIG. 3 in which the stator windings of motor 1 are diagrammatically illustrated, a winding set M is provided which includes a main winding 19 and an extended or supplemental winding 21. Main winding 19 is comprised of two coil sets or physical poles 19a, 19b with each of these coils sets including an outer coil 23 and one or more inner coils 25. Supplemental winding 21 also has two coil sets 21a and 21b with each including at least one coil. Each of the coils in main winding 19 and in supplemental winding 21 is comprised of a plurality of turns of suitable magnet wire or the like. Coil sets 19a and 19b are inserted in selected slots S of core 7 so that the coil sets are generally on opposite sides of bore 11 from one another. As shown, the outer coil 23 of coil set 19a is inserted in slots S5 and S20 with the inner coils 25 being inserted in selected slots between S5 and S20. Likewise, the outer coil of coil set 19b is inserted in slots S8 and S17 with the inner coils inserted in slots therebetween. Supplemental coil winding sets 21a and 21b are respectively inserted in selected slots S6 and S19 and in slots S7 and S18.

Coil sets 19a and 19b each have a predetermined number of turns A therein and supplemental coil sets 21a and 21b each have B turns therein so that the total number of turns in each main winding coil set 19a or 19b and its corresponding supplemental coil set 21a or 21b is equal to C, where $C = A + B$.

In addition to main winding 19 and supplemental winding 21, a first (or four pole) auxiliary winding 27 and a second (or two pole) auxiliary winding 29 are also inserted in selected slots S of core 7. Four pole auxiliary winding 27 has four coil sets or physical poles 27a, 27b, 27c and 27d. As shown, the outer coil of coil set 27a is inserted in slots S1 and S6, the outer coil of coil set of 27b is inserted in slots S24 and S19, the outer coil of coil set 27c is inserted in slots S13 and S18, and the outer coil of coil set 27d is inserted in slots S12 and S7. Auxiliary winding 29 has two coil sets or physical poles 29a and 29b and the outer coil of coil set 29a is inserted in slots S1 and S12 and the outer coil of coil set 29b is inserted in slots S13 and S24 with the coil sets on opposite sides of bore 11.

Figure 4:
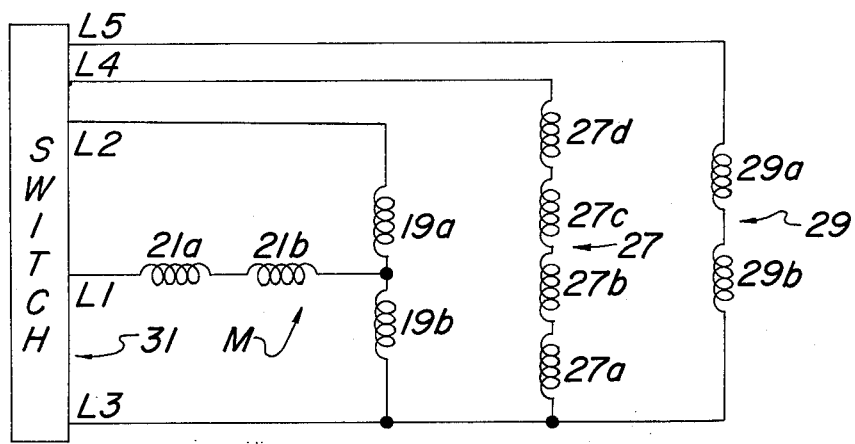
FIG. 4 is a wiring diagram of the motor of this invention illustrating the various leads connected to a suitable switch for selective operation of the motor in either a high or low speed mode of operation.

A first power input lead L1 is connected to the inner coil of supplemental coil set 21a. A first jumper J1 connects the outer coils of coil sets 21a and 21b. A second jumper J2 interconnects the inner coil of coil set 21b and the inner coil of main coil set 19a. The outer end of main coil set 19a is connected to a second lead L2. The outer end of main coil 19b is connected to jumper J2. The inner end of main coil 19b is connected to a third power lead L3. The inner coil of the fourth coil set 27d of four pole auxiliary winding 27 is connected to a fourth lead L4. The coil sets of this four pole auxiliary winding are serially connected together by jumpers J3, J4 and J5. Coil set 27a is connected to power lead L3. The latter is also connected to coil set 29b of the two pole auxiliary winding 29. A jumper J6 interconnects coil sets 29a and 29b and a fifth lead L5 is connected to coil set 29a. As shown in FIG. 4, main winding coil sets 19a and 19b are serially connected together as are supplemental winding coil sets 21a and 21b. Auxiliary coil sets 27a–27d and coil sets 29a and 29b of the respective four and two pole auxiliary windings are also serially connected to one another.

Figure 5:
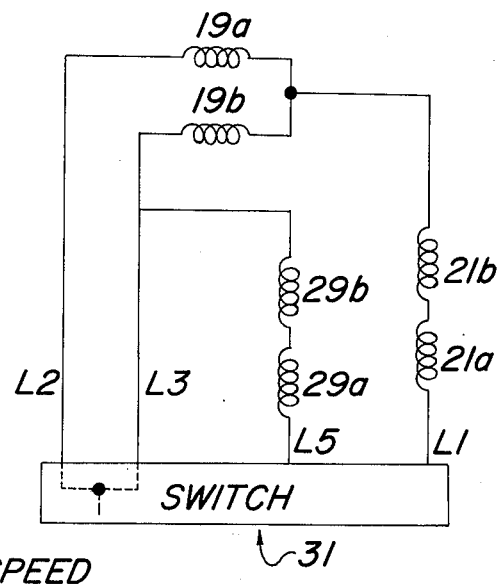
FIG. 5 is an electrical schematic of the stator assembly connected for its high speed mode of operation.
Figure 6:
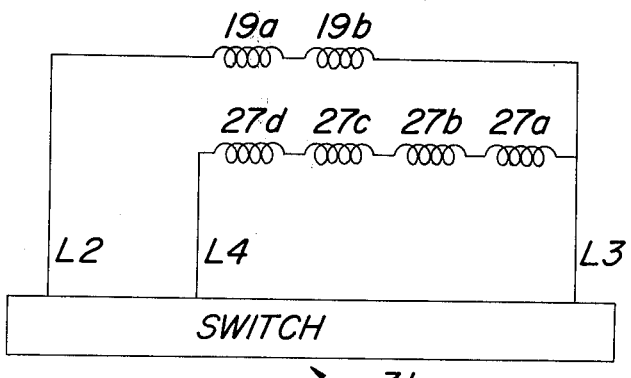
FIG. 6 is an electrical schematic of the stator assembly connected for its low speed mode of operation.

As shown in FIGS. 4–6, leads L1–L5 are connected to a suitable switch means 31 which in turn is connected to a source of single phase alternating current electrical power. This switch is conventional and may be any one of a variety of commercially available switches. Therefore, the structure and operation of this switch are not herein disclosed or described in detail. As mentioned above, this invention is particularly applicable to, but not limited to, hermetic motors and thus leads L1–L5 may be adapted to pass through the compressor shell (or similar structure) in which a hermetic motor of this invention is housed. As is conventional, switch means 31 may be adapted to be mounted exteriorily of the compressor shell.

As shown in FIG. 5, when motor 1 is energized for high speed (or two pole) operation, lead L4 is open thereby deenergizing the four pole auxiliary winding 27. Additionally, leads L2 and L3 are commonly connected so as to complete a circuit through leads L1 and L5. Thus, the magnetic poles of motor 1, when operated in its high speed mode of operation, are each made up of a coil set 19a and 19b which is in turn connected to supplemental coil sets 21b or 21a with the former being connected in parallel for two pole operation. Thus, a portion of each magnetic pole is made up of one portion (e.g., coil set 21a or 21b) which is series connected to another portion of the main coil (e.g., main coil set 19a or 19b). Also, the two pole auxiliary winding 29 is energized during high speed or two pole mode of operation. With motor 1 energized by 60 Hertz, single phase, alternating current electrical power, the motor will have a synchronous unloaded speed of about 3,600 rpm (ignoring slip) during two pole operation.

With switch 31 set for operation of motor 1 in its low speed or four pole mode of operation (as shown in FIG.

6), leads L1 and L5 are open thereby deenergizing supplemental winding coil sets 21a and 21b and two pole auxiliary winding 29. The main winding poles 19a and 19b are series connected so as to form two consequent poles which in turn produce four electrical or magnetic poles. The separate four pole auxiliary winding 27 is, of course, energized during low speed mode of operation. When motor 1 of this invention is connected as described above, the motor will operate at an unloaded synchronous speed of about 1,800 rpm (again ignoring slip) during four pole operation.

In accordance with this invention, it will be particularly noted that in high speed (or two pole) operation, the number of effective turns C in the stator assembly is the sum of the number of effective turns A in coil set 19a or 19b and the number of effective turns B in its corresponding supplemental coil set 21a or 21b. Thus, in high speed operation, C=A+B. Also, the breakdown torque $T_H$ of the motor in high speed operation is proportional to the inverse square of the total number of effective turns, or $$T_H \alpha 1/(A+B)^2 \text{ or } (1/C^2).$$

However, in low speed or four pole operation of the motor, there are fewer turns in the stator assembly. As a consequence, the low speed breakdown torque $T_L$ of the motor is greater than it would have been if the motor had the same number of turns for both high and low speed operation. Like with the high speed breakdown torque described above, the low speed breakdown torque $T_L$ is proportional to the inverse square of the number of effective turns in the stator assembly. Thus, $$(T_L \alpha (1/A^2).$$

It will be understood that the effective turns A and B are not the same value for both the high and low speed, but are determined as to the mode of operative high or low speed.

Further in accordance with this invention, it will be appreciated that in the design of motor 1, the low speed breakdown torque of the motor can be selected to be less than, equal to, or greater than a desired high speed breakdown torque of the motor. More specifically, the smallest low speed breakdown torque for motor 1 is limited to about 55 percent of its high speed breakdown torque. This change in relation between the low and high speed breakdown torque of motor 1 is accomplished by varying the number of effective turns B in supplemental coil sets 21a and 21b while keeping the total number of effective turns C in the main winding constant thereby so as to not appreciably affect the high speed breakdown torque $T_H$ of the motor.

The method of this invention of providing or constructing a two speed motor 1 will herein be described. The motor has a rotor assembly 5 and a stator asssembly 3 with the latter including a main winding 19 and a supplemental winding 21 with power input leads L1, L2 and L3 connected thereto as shown in FIG. 4 for selected connection of the main winding and supplemental windings to a source of single phase, alternating electrical power. Specifically, the method comprises the steps of forming the main winding so that it has at least two physical poles or coil sets 19a, 19b with each coil set having an outside coil 23 and one or more inner coils 25. Likewise, the supplemental windings are formed to have two coil sets or physical poles 21a or 21b. A main winding physical pole 19a or 19b and its corresponding supplemental physical pole 21a or 21b are then inserted into prescribed slots S provided in core 7 of stator assembly. Leads L1, L2 and L3 and jumpers J1 and J2 are connected to the main winding and supplemental winding coil sets as described above. In accordance with this invention, when the motor is energized for its low speed mode of operation, the supplemental windings are deenergized. As described above, this results in fewer effective turns being included in the stator assembly of the motor when the motor is operated in its low speed mode of operation and, as a consequence, the low speed breakdown torque of the motor is greater than it would have been if the motor had the same number of turns for high and low speed operation.

Numerous variations of motor 1 are included within the scope of this invention and in the appended claims and these variations will be readily apparent to those skilled in the art. Thus, lamination design, the number of slots S, tooth span, number of poles and number of turns in the windings may be varied in other embodiments of this invention. I have found that the following winding configuration of the inner and outer coils of the windings of a single phase motor 1 gives adequate performance: main winding 19 consists of 23-39-39-30 turns of # 15½ copper wire wound over 3, 5, 7 and 9 teeth; supplemental or extended winding 21 consists of 14 turns of 2# 16 copper wire wound over 11 teeth; two pole auxiliary winding 29 consists of 18-19-19-40 of 1 #19 copper wire wound over 5, 7, 9 and 11 teeth; and, four pole auxiliary winding 27 consists of 37–48 turns of 1 #19 copper wire wound over 3 and 5 teeth. A motor so constructed and having a 4.0 inch stack height have high and low synchronous speeds of 3600 and 1800 rpm, respectively, and puts out approximately 3.5 and 1.75 horsepower in its respective high and low operating speeds of 3520 rpm and 1760 rpm when energized by single phase, 60 Hz, alternating current.

In accordance with this invention, to vary the four pole (or low speed) torque output (i.e., breakdown torque) of the motor, the number of effective turns A in the main winding coil sets 19a and 19b and the number of effective turns B in the supplemental winding coil sets 21a and 21b may be varied while keeping the total number of effective turns C in the stator assembly constant so as not to affect the high speed torque of the motor.

Of course, it will be herein understood that the inner and outer coils contained in the coil sets or physical poles of motor 1 of this invention are electrically series connected to one another. It will also be understood that each main winding coil set 19a or 19b can have another coil (not shown) on its outside. Also, each supplemental coil set 21a or 21b may consist of either a single coil or a number of (usually two) coils.

It will be particularly noted that with the so-called extended winding motor 1 of this invention that, like with distinct winding motors, the low speed breakdown torque of the motor may be varied, to be less than, equal to, or even greater than the high speed breakdown torque of the motor, but yet only one main winding set M (i.e., main winding 19 and supplemental winding 21) need be provided.

It will be also understood that the order of inserting the various coils in slots S need not be as shown in FIG. 1, but that different arrangements are possible.

In view of the above, it will be seen that other objects and features of the invention are achieved and other advantageous results are attained.

As various changes could be made in the above constructions and methods without departing from the scope of the invention, it is intended that all matter contained in the description or shown in the accompanying drawings shall be interpreted as illustrative and not in a limiting sense.

I claim:

1. A multiple speed dynamoelectric machine having at least a high speed and a low speed mode of operation comprising:

a rotor assembly;

a stator core constructed from a stack of laminations of suitable magnetic material, each of said laminations having a central opening therethrough with a plurality of notches extending generally radially outwardly from said central opening, the latter constituting a bore extending longitudinally through said core for reception of said rotor assembly and said notches constituting a plurality of slots extending longitudinally through said core for forming a plurality of winding receiving slots;

a main winding including two physical poles, the latter each having one or more coils therein which are inserted in selected slots of said core with the main winding physical poles being on generally opposite sides of said bore, said main winding having a first predetermined number of effective turns therein in high speed mode and a second predetermined number of effective turns in low speed mode of operation;

a supplemental winding including two physical poles, the latter each having at least one coil which is inserted in selected slots of said core, said supplemental winding having a third predetermined number of effective turns therein;

a first auxiliary winding;

a second auxiliary winding; and a plurality of leads electrically connected to said main, supplemental, and auxiliary windings for multiple speed operation of said dynamoelectric machine, said leads being so connected to said windings such that during high speed operation of the dynamoelectric machine said supplemental winding is energized and the high speed breakdown torque of the dynamoelectric machine is proportional to the inverse square of the sum of said first predetermined number of turns in said main wind plus the predetermined number of effective turns in said supplemental winding, and such that during low speed operation said supplemental winding is de-energized and the low speed breakdown torque of the dynamoelectric machine is proportional to the inverse square of the said second predetermined number of effective turns of said main winding whereby the torque of the dynamoelectric machine when operated at low speed may be preselected to be less than, equal to, or greater than the torque of the dynamoelectric machine when operated at high speed by selectively varying the number of turns in said main and supplemental winding.

2. A two speed, single phase motor selectively operable in either a high or low speed mode of operation with the breakdown torque of the motor in its low speed mode of operation being selected to be less than, equal to or greater than the breakdown torque of the motor in its high speed mode of operation, said motor comprising:

a rotor assembly;

a core made up of a stack of laminations of suitable magnetic material, said core having a central bore therethrough for reception of said rotor assembly and a plurality of winding receiving slots extending radially outwardly from the bore and longitudinally through said core;

a main winding including two coil sets, each of said main winding coil sets having an outer coil and one or more inner coils, said coil sets of said main winding being received in selected slots of said core generally on opposite sides of said bore, said main winding having a first predetermined number of effective turns A when operated at high speed and a second predetermined number of effective turns A' when operated at low speed;

a supplemental winding having a pair of supplemental winding coil sets, each of the latter having a predetermined number of effective turns B of magnet wire therein, each of said supplemental coil sets being inserted in said selected slots;

a plurality of leads connected to said main winding and to said supplemental winding;

switch means for selectively connecting said leads to a source of single phase, alternating current for either high speed or low speed operation of said motor, said motor when operated in its high speed mode having a breakdown torque approximately proportional to:

$$1/(A+B)^2,$$

and, when the motor is operated at low speed mode of operation, said motor having a breakdown torque approximately proportional to:

$$(1/A'^2,).$$

* * * * *

UNITED STATES PATENT AND TRADEMARK OFFICE
CERTIFICATE OF CORRECTION

PATENT NO. : 4,322,665
DATED : March 30, 1982
INVENTOR(S) : Robert A. Landgraf

It is certified that error appears in the above—identified patent and that said Letters Patent is hereby corrected as shown below:

Column 1, line 23, "mechancial" should be "mechanical".

Column 7, line 21, "$_H a$" should be "$_H \propto$".

Column 7, line 21, "$(1/C^2)$" should be "$1/C^2$".

Column 7, line 35, "$(T_L a (1/A^2)$" should be "$T_L \propto 1/A^2$".

Column 7, line 57, "asssembly" should be "assembly".

Column 8, line 27, "# 15 1/2" should be "1# 15 1/2".

Signed and Sealed this

Seventeenth Day of August 1982

[SEAL]

Attest:

*Attesting Officer*

GERALD J. MOSSINGHOFF
*Commissioner of Patents and Trademarks*